Patented Mar. 8, 1949

2,464,075

UNITED STATES PATENT OFFICE 2,464,075

PROCESS FOR SIMULTANEOUSLY RECOVERING PROTEIN AND HEMICELLULOSE FROM OIL SEED RESIDUE MEAL

Glenn Davidson, Aurora, Ill.

No Drawing. Application June 2, 1948,
Serial No. 30,732

4 Claims. (Cl. 260—112)

This application is a continuation, in part and as to common subject matter, of my application Serial No. 471,761, filed January 8, 1943, now abandoned.

Soya bean meal has been the source of two types of adhesives, (1) soya bean flour adhesives, (2) chemically isolated soya bean protein.

The soya bean meal for either type of adhesive must be very specially and carefully handled during the process of oil removal to avoid so far as possible the denaturation of the protein constituent of the meal.

Soya bean flour adhesives are made from the above mentioned soya bean meal by a dry grinding process, similar to that used in making high grade wheat flour. That is, every effort is made to remove as much as possible of the crude cellulose. But even so, if an aqueous alkaline dispersion of a soya bean flour adhesive is diluted and screened on a 200 mesh screen, anywhere from 20 grams to 200 grams of wet paste sludge will be retained on the screen for each 100 grams of original dry soya bean flour adhesive used in making the dispersion. This sludge is 90%–95% water. Its dry content is mostly crude cellulose. Its presence in the alkaline dispersion of the soya bean flour adhesive adversely affects the working properties and the results of the adhesive very greatly for many purposes.

Soya bean flour adhesives also contain 25%–30% of water soluble sugars, gums and albumins, which are deleterious for a water resisting adhesive.

The yield of soya bean flour adhesive obtained from 100 lbs. soya bean meal is about 90 lbs.

Chemically isolated soya bean protein is made by a process which follows the following general lines: The soya bean meal is digested, usually in the cold, with a dilute solution of caustic soda. The resulting dispersion is clarified by centrifuging. The clarified solution is acidulated to a pH of about 4.5. This precipitates the soya bean protein as a curd. The curd is washed and dried. A nearly pure protein product is obtained. The yield of chemically isolated protein secured from 100 lbs. of soya bean meal is about 35 lbs.

I have found that an adhesive superior in many respects to either soya bean flour adhesive or chemically isolated soya bean protein can be made from soya bean meal by providing a mixture of hemicellulose constituent of soya bean and the protein constituent and simultaneously eliminating the crude cellulose and the water soluble sugars and albumins.

To the accomplishment of the foregoing and related ends, the invention, then, comprises the features hereinafter fully described, and particularly pointed out in the claims, the following description setting forth in detail certain illustrative embodiments of the invention, these being indicative, however, of but a few of the various ways in which the principle of the invention may be employed.

The reason for the behavior of the hemicellulose or cell-fragment material, particularly in the presence of the protein, is obscure and not fully understood. If the hemicellulose is isolated and washed free of protein, it will look like very fine wet wood flour. If washed with distilled water and allowed to dry, however, it produces a reasonably continuous film, instead of a powder as might be expected, from its wet appearance.

If to a wet paste of isolated hemicellulose material is added an alkaline solution of soya protein, a change occurs, which is similar to and no less spectacular than that which occurs when a deflocculating agent is added to a heavy paste of clay. That is, under such conditions, the hemicellulose material appears to deflocculate and become very gummy.

From a practical standpoint, when this mixture of hemicellulose and protein is used as a laminating adhesive for example, the adhesive is held near the glue line and excessive penetration prevented as compared to that which occurs with chemically isolated soya protein.

Again when this mixture of hemicellulose and protein is used in surface sizing paper, it fills in the surface of the sheet and produces a smoother sheet than either chemically isolated soya protein or soya bean flour adhesive. Probably the reason it produces a smoother sheet than chemically isolated soya protein is again retardation of penetration. Thus the adhesive more completely remains on the surface of the sheet, filling in the microscopic low places. The reason it produces a smoother sheet than a soya bean flour adhesive is that the crude cellulose in such an adhesive greatly deteriorates the smoothness of the sheet.

If a soya bean flour adhesive is used in preparing an aqueous ink such as is used in printing wall paper, the crude cellulose appears to enter into so-called "mutual precipitation" with many of the color-lakes used. In any event, an undesirable grainy condition results. This does not occur with the mixture of hemicellulose and protein. On the other hand, the hemicellulose acts as a pigment suspending agent, a quality not possessed by the chemically isolated protein.

When a clay coating color (used in clay coating paper) made up with a soya bean flour adhesive is applied with a brush-coater, it is practically impossible to eliminate brush marks. This appears to be due to the particles of crude cellulose, which are larger than 200 mesh wet, being momentarily caught on the brush tips.

If such a color is applied with a roller coater, the particles of crude cellulose which are larger than 200 mesh in their wet state, fail to follow the sheet under the nip of the roller. This means that they segregate and accumulate in the supply tank, with the result that color in the supply tank shortly becomes so mushy in consistency that it must be discarded.

None of these difficulties are encountered if the clay coating color is made with the mixture of protein and hemicellulose.

To secure this mixture of hemicellulose and protein, substantially free of crude cellulose and water soluble constituents, I first digest the soya bean meal with dilute caustic soda solution, as for instance 0.4% (or 4% NaOH based on the meal). Then the dispersion is passed over a fine perforated surface, as a 200 mesh (or finer) screen. The sludge passing over the screen is either rejected or washed with water or dilute alkali and passed over the screen again.

The liquid which passes through the screen is acidulated to a pH of approximately 4.5. This precipitates the combination of protein and hemicellulose. The precipitate is washed and dried. The yield is 50%-60% of the weight of the soya bean meal used as compared to 35% in the case of chemically isolated protein. This must not be taken to mean that this difference in yield is all made up of hemicellulose. The reason for this is that when the hemicellulose fraction is eliminated in the manufacture of chemically isolated protein by centrifuging or other means, the peculiar affinity of hemicellulose for protein causes it to drag out a considerable portion of protein with it. Thus, by retaining the hemicellulose I am able to recover a larger fraction of the total protein in the original meal.

Actually, while I secure 50-60 lbs. of adhesive from each 100 lbs. of meal as compared to 35 lbs. for chemically isolated protein, I am retaining in that amount of adhesive only from about 5-17 lbs. of hemicellulose. The amount of hemicellulose in the final product may be varied at will, within limits, by controlling fineness of the original meal, the number of times the original sludge passing over the screen is diluted and re-run over the screen and to some extent by the operation and fineness of the screen. Such product or mixture of soya bean protein and soya bean hemicellulose is made up of about 65-90 per cent of soya bean protein and 10-35 per cent of hemicellulose, and is substantially free from cellulose, and water soluble sugars, gums and albumins.

It is known in the art to remove the cellulose and the hemicellulose together from a solution of the protein, and then acid-precipitate the protein alone as product. It is also known to collect cellulose and protein and hemicellulose all together as product. The present process, to the contrary, selectively removes cellulose alone, to leave a liquid containing protein and hemicellulose and then segregates a product of co-precipitated protein and hemicellulose by precipitating. Any suitable means may be employed in the first step to attain the result of selectively removing the cellulose and leave a liquid containing the protein and hemicellulose. Since a customary type of fixed screen cannot do this, it is necessary that any screen to be applicable should be of clearing or moving character. Thus, for example, there may be used in the cellulose-separating step a traveling screen in the form of an endless belt passing over a suction box and the screen being washed clean on its return trip, or screen substituted for cloth on an Oliver type filter, or a vibrating screen. The fineness of screen should be such as to retain the cellulose fiber. This will require a mesh of generally 200, although in some instances it may be somewhat coarser or finer. I prefer generally a vibrating flat screen mounted at an angle of between 5° and 40° (usually between 15° and 30°) to the horizontal plane. The material is fed to the screen so that it flows down the slope of the screen. It may be distributed across the screen by a pipe containing a series of perforations, or by a dam having a series of notches in its crest or by a spray or by any other convenient means. The screen may be oscillated substantially in its own plane and at right angles to the direction of flow of the material at a rate of vibration in general rapid. A satisfactory amplitude is about 1/8"-1/4" and a satisfactory frequency is about 600 per minute.

Other modes of applying the principle of the invention may be employed, change being made as regards the detail described, provided the features stated in any of the following claims, or the equivalent of such, be employed.

I therefore particularly point out and distinctly claim as my invention:

1. A process of making an adhesive, comprising, first, digesting soya bean meal with treating-material consisting of an aqueous alkali solution and dissolving the protein and suspending hemicellulose in the solution in finely divided form while not attacking cellulose fiber, then feeding the mixture to a screen surface having openings not larger than 200 mesh fineness and matting and retaining the cellulose fiber while freeing the fine hemicellulose by rapid vibration to pass through with the liquid, and finally precipitating the hemicellulose together with the protein by acidulating the liquid.

2. A process of making an adhesive, comprising, first, digesting oil seed residue meal with treating-material consisting of an aqueous alkali solution and dissolving the protein and suspending hemicellulose in the solution in finely divided form while not attacking the cellulose fiber, then feeding the mixture to a fine-perforated screening surface and matting and retaining the cellulose fiber while freeing the hemicellulose by rapid vibration to pass through with the liquid, then precipitating the hemicellulose together with the protein by acidulating the liquid, and washing and drying the co-precipitated hemicellulose and protein.

3. A process of making an adhesive, comprising forming a suspension of hemicellulose in a protein solution by, first, digesting oil seed residue meal with treating-material consisting of an aqueous alkali solution, then feeding the mixture to a fine-perforated screening surface with rapid vibration and matting and retaining cellulose fiber while freeing the fine hemicellulose to pass through with the liquid, and finally co-precipitating the hemicellulose and protein by acidulating.

4. A process of making an adhesive, comprising digesting oil seed residue meal with treating-material consisting of an aqueous alkali solution to form a solution of protein in which is suspended undissolved particles of cellulose fiber and finely divided hemicellulose, then selectively restraining the cellulose by a fine perforated surface and agitating the cellulose and clearing it from the perforated surface and freeing the hemicellulose and passing the protein and fine hemicellulose through in the liquid, and finally acid-precipitating the protein and hemicellulose together.

GLENN DAVIDSON.

REFERENCES CITED

The following references are of record in the file of this patent:

UNITED STATES PATENTS

| Number | Name | Date |
|---|---|---|
| 1,794,105 | David et al. | Feb. 24, 1931 |
| 2,274,983 | Hieronymus | Mar. 3, 1942 |